(12) United States Patent
Snodgrass

(10) Patent No.: US 7,969,919 B1
(45) Date of Patent: Jun. 28, 2011

(54) SYSTEM AND METHOD FOR THERMAL LOAD SHARING BETWEEN NODES IN A COMMUNICATIONS NETWORK

(75) Inventor: Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1946 days.

(21) Appl. No.: 11/199,426

(22) Filed: Aug. 8, 2005

(51) Int. Cl.
*H04L 12/16* (2006.01)

(52) U.S. Cl. ........ 370/270; 370/352; 370/384; 709/222; 709/224

(58) Field of Classification Search .................. 709/224, 709/222, 209, 223; 340/531; 375/346; 726/1; 374/183; 395/200
See application file for complete search history.

(56) References Cited

U.S. PATENT DOCUMENTS

| | | | |
|---|---|---|---|
| 5,719,868 A | 2/1998 | Young | 370/436 |
| 5,732,215 A * | 3/1998 | Boutaghou et al. | 710/74 |
| 6,309,099 B1 * | 10/2001 | Chang | 374/183 |
| 6,331,973 B1 | 12/2001 | Young et al. | 370/337 |
| 6,425,092 B1 * | 7/2002 | Evans et al. | 714/13 |
| 6,574,117 B1 | 6/2003 | Lebo | 361/801 |
| 6,577,641 B1 | 6/2003 | Izumi | 370/442 |
| 6,580,730 B1 | 6/2003 | Loukianov | 370/522 |
| 6,600,754 B1 | 7/2003 | Young et al. | 370/459 |
| 6,631,124 B1 | 10/2003 | Koorapaty et al. | 370/337 |
| 6,665,189 B1 | 12/2003 | Lebo | 361/730 |
| 6,741,466 B1 | 5/2004 | Lebo | 361/687 |
| 6,747,866 B1 | 6/2004 | Lebo et al. | 361/679 |
| 6,791,994 B1 | 9/2004 | Young et al. | 370/436 |
| 6,801,513 B1 | 10/2004 | Gibbons et al. | 370/337 |
| 6,810,022 B1 | 10/2004 | Young | 370/280 |
| 6,816,562 B2 | 11/2004 | Atkinson et al. | 376/39 |
| 6,950,855 B2 * | 9/2005 | Sampathkumar | 709/209 |
| 7,019,639 B2 * | 3/2006 | Stilp | 340/531 |
| 7,039,694 B2 * | 5/2006 | Kampe et al. | 709/222 |
| 7,269,648 B1 * | 9/2007 | Krishnan et al. | 709/224 |
| 2001/0014049 A1 * | 8/2001 | Woo et al. | 365/211 |
| 2002/0067709 A1 | 6/2002 | Yamada et al. | 370/337 |
| 2003/0016770 A1 * | 1/2003 | Trans et al. | 375/346 |
| 2003/0115369 A1 | 6/2003 | Walter et al. | 709/253 |
| 2003/0165155 A1 | 9/2003 | Johnson et al. | 370/442 |
| 2004/0057407 A1 | 3/2004 | Balachandran et al. | 370/336 |
| 2004/0125784 A1 | 7/2004 | Lee et al. | 370/345 |
| 2004/0152478 A1 | 8/2004 | Ruohonen et al. | 455/502 |
| 2006/0059537 A1 * | 3/2006 | Alvermann et al. | 726/1 |

(Continued)

OTHER PUBLICATIONS

"The Software Defined Radio (SDR) in Network Centric Operations (NCO)" by Alan C. Trimble, Ph.D. being presented at the IEEE, Oct. 2005.

(Continued)

*Primary Examiner* — Robert W Wilson
*Assistant Examiner* — Mohamed Kamara
(74) *Attorney, Agent, or Firm* — Matthew J. Evans; Daniel M. Barbieri

(57) ABSTRACT

A method for sharing thermal load between nodes in a communication network includes monitoring the thermal load of a first node in the communication network. The first node is an advantaged node. When the thermal load of the first node is a predetermined value, a second node is selected as an advantaged node. A notification message is transmitted to the plurality of nodes in the communication network identifying the second node as an advantaged node for at least a subset of message traffic of the first node.

20 Claims, 3 Drawing Sheets

U.S. PATENT DOCUMENTS

2006/0106503 A1* 5/2006 Lamb et al. .................. 700/299
2007/0011288 A1* 1/2007 Cases et al. .................. 709/223

OTHER PUBLICATIONS

U.S. Appl. No. 10/198,361 entitled "Ruggedized Electronics Sub-System Module" and having inventor Steve I. Lebo.

U.S. Appl. No. 10/197,737 entitled "Ruggedized Electronics Module Cooling System" and having inventors Steve I. Lebo and Scott J. Sellner.

U.S. Appl. No. 10/229,941 entitled "Modular Communication Platform" and having inventor Richard D. Spring, Timothy E. Snodgrass, Robert R. Jakoubek and Steve I. Lebo.

U.S. Appl. No. 11/199,451 entitled "System And Method For Net Formation And Merging In Ad Hoc Networks" and having inventor Timothey E. Snodgrass, which is filed on the same day herewith.

U.S. Appl. No. 11/199,545 entitled "Low Power, Programmable Modem For Software Defined Radio Applications" and having inventor Timothey E. Snodgrass and James A. Stevens, which is filed on the same day herewith.

U.S. Appl. No. 11/199,440 entitled "Improved Net Formation-Merging System And Method" and having inventor Timothey E. Snodgrass and James A. Stevens, which is filed on the same day herewith.

* cited by examiner

SYSTEM AND METHOD FOR THERMAL LOAD SHARING BETWEEN NODES IN A COMMUNICATIONS NETWORK

FIELD OF THE INVENTION

The present invention relates generally to communication networks and in particular, to a system and method for thermal load sharing between nodes in a communications network.

BACKGROUND OF THE INVENTION

Wireless communication networks may be used for numerous applications including tactical military and commercial applications. In an exemplary military application, military vehicles (e.g., tanks, trucks, airplanes, etc.) may include radios that act as nodes in the wireless communication network. One type of radio is a software defined radio (SDR). A software defined radio may be implemented in existing radios and the existing physical enclosures of these radios (i.e., the legacy radio form factors). As a result, the thermal limitations of the existing radio structure is imposed on the software defined radio. A digital radio, such as an SDR, may generate more power and heat than a legacy radio and a legacy radio enclosure may not have appropriate fans or fins to dissipate the heat and power. In addition, the radio temperature may be affected by the temperature of the external environment as well as the duty cycle of the radio (e.g., an SDR may transmit greater percentage of time than a legacy radio).

Thermal limitations of the physical enclosure of legacy radios can impact the ability of an SDR to operate in an ad hoc manner. In particular, thermal constraints of the radio enclosure may impact the ability of an SDR to function as an ad hoc relay (e.g., a cluster head or advantaged node). A wireless communication network may include advantaged nodes (e.g., on a ground platform, an airborne platform, a naval based platform, etc.) which have enhanced visibility or connectivity to other nodes in the network and therefore may have a larger number of one-hop neighbor nodes than a non-advantaged node. For example, a node may be selected as a relay node if the node can reach a particular destination or destinations in less hops. An advantaged node typically processes a large amount of traffic and therefore may generate more power and heat. When the thermal capacity of the ad hoc relay node is exceeded, the relay node must shut down which can disrupt the entire communication network. As a result, the performance of the network may be limited to the throughput of a single relay node.

There is a need, therefore, for a system and method to share (or shift) the thermal load of a relay node in a communication network. There is also a need for a system and method to assign a new relay node with additional thermal capacity and shift at least a portion of the thermal load from an original relay node. Accordingly, a system and method may be provided to select a new cluster head in response to the thermal load of an original cluster head and shift at least a portion of traffic to the new cluster head (i.e., other nodes in the network may direct/send traffic to the new cluster head) to prevent shut down of the original cluster head and disruption of the communication network.

SUMMARY OF THE INVENTION

In accordance with one embodiment, a method for sharing thermal load between nodes in a communication network includes monitoring the thermal load of a first node in the communication network, the first node being an advantaged node, selecting a second node as an advantaged node when the thermal load of the first node is a predetermined value, transmitting a notification message to the plurality of nodes in the communication network identifying the second node as an advantaged node for at least a subset of message traffic of the first node.

In accordance with another embodiment, a node for a communications network includes an antenna, a transceiver coupled to the antenna and configured to transmit and receive messages, and a control circuit coupled to the transceiver and configured to monitor the thermal load of the node, to select a second node in the communication network as an advantaged node when the thermal load of the node is a predetermined value, and to transmit a notification message identifying the second node as an advantaged node.

In accordance with one embodiment, a method for sharing thermal load of a relay node in a communication network having a plurality of nodes includes monitoring the thermal load of a first relay node in the communication network, selecting a node as a second relay node when the thermal load of the first relay node is a predetermined value, transmitting a notification message to the plurality of nodes in the communication network identifying the second relay node as a relay node for at least a subset of message traffic of the first relay node and transmitting the subset of message traffic through the second relay node.

BRIEF DESCRIPTION OF THE DRAWINGS

The invention will be more readily understood by reference to the following description taken with the accompanying drawings, in which.

DETAILED DESCRIPTION OF THE PREFERRED EMBODIMENTS

Figure 1:
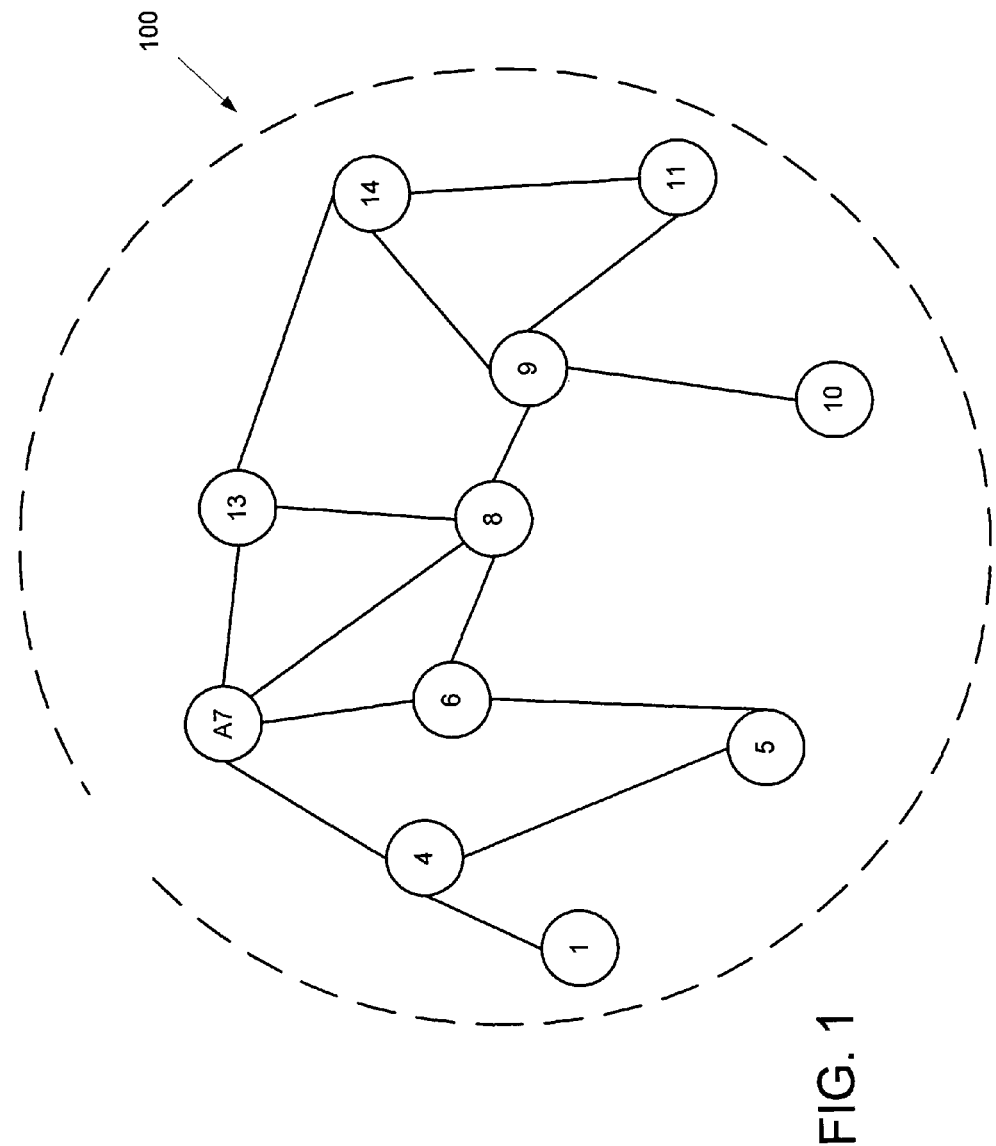
FIG. 1 is a diagram of a wireless communication network having a plurality of nodes in accordance with an embodiment.

FIG. 1 is a diagram of a wireless communication network 100 including a plurality of nodes in accordance with an embodiment. In an exemplary embodiment, wireless communication network 100 may be a Joint Tactical Radio System (JTRS) or other ad hoc wireless network. Nodes 1 through 14 in network 100 may be, for example, a ground based node (e.g., a radio in a tank or other military vehicle), an airborne based node, a naval based node, or other appropriate platform. Each node in network 100 may be a software defined radio (SDR). Preferably, each node in network 100 communicates in accordance with a structured wireless channel access scheme such as Time Division Multiple Access (TDMA) or Code Division Multiple Access (CDMA). Slot assignments may be coordinated by a protocol such as Unifying Slot Assignment Protocol (USAP).

Network 100 may include both non-advantaged nodes. e.g., nodes 1-6 and 8-14 and advantaged nodes (i.e., a cluster head or relay node) such as node A7. An advantaged node, such as node A7, has enhanced visibility and connectivity to other nodes in network 100 and therefore may have a larger number of one-hop neighbor nodes than a non-advantaged node. Non-advantaged nodes in network 100 may use advantaged node A7 as a relay node (or cluster head) to reach other nodes in network 100. Various algorithms may be used to appoint a node as an advantaged node. For example, a node may be appointed as an advantaged node if the node has the widest coverage, the shortest paths, the most addresses with direct access, etc.

A plurality of nodes may contend for access to and use advantaged node A7. As advantaged node A7 is used to receive, process and transmit traffic, it generates power and heat (i.e., a thermal load). The thermal load of the node may be affected by operation of the node, the number of messages processed by the node as well as the duty cycle of the node. In addition, the temperature of the external environment may cause an increase of the thermal load of the node. Advantaged node A7 is configured to share or shift the thermal load with another node or nodes in network 100 in order to prevent overheating and shut down of advantaged node A7 as well as disruption of network 100. The other nodes in network 100 may also be configured to share or shift thermal load.

Figure 2:
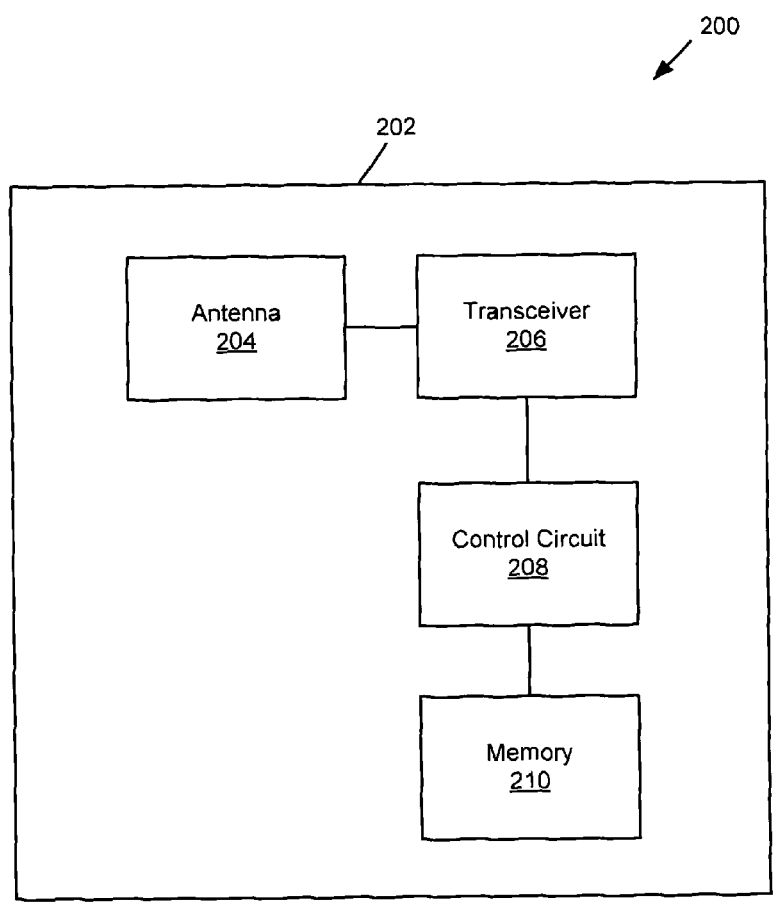
FIG. 2 is a schematic block diagram of a node in a wireless communication network in accordance with an embodiment.

FIG. 2 is a schematic block diagram of a node in a wireless communication network in accordance with an embodiment. In an exemplary embodiment, node 200 is a radio in a military vehicle, such as a software defined radio. Node 200 includes an antenna 204, a transceiver 206, a control circuit 208 and a memory 210. Node 200 also has a physical enclosure 202, for example, a software defined radio may be implemented in an existing radio enclosure (i.e., a legacy radio form factor). Physical enclosure 202 may have thermal limitations that may effect the operation of node 200.

Transceiver 206 is coupled to antenna 204 and control circuit 208. Transceiver 206 includes transmit and receive circuitry and is configured to transmit and receive signals via antenna 204. Node 200 is configured to communicate with (e.g., receive signals from and transmit signals to) other nodes in a communication network 100 (shown in FIG. 1). Control circuit 208 is coupled to transceiver 206 and memory 210. Control circuit 208 may include various types of control circuitry, digital and/or analog, and may include a microprocessor, microcontroller, application specific integrated circuit (ASIC), or other digital and/or analog circuitry configured to perform various input/output, control, analysis, and other functions described herein. Memory 210 includes volatile and/or non-volatile memory to, for example, store a computer program or software to perform the functions described herein. Control circuit 208 may execute sequences of instructions contained in memory 210. In an exemplary embodiment, node 200 is configured to communicate in an ad hoc manner using a structured wireless channel access scheme such as TDMA.

Node 200 may be designated as an advantaged node. Various algorithms known in the art may be used to appoint node 200 as an advantaged node. For example, a node may be appointed as an advantaged node if the node has the widest coverage, the shortest paths, the most addresses with direct access, etc. As node 200 processes message traffic to/from other nodes in the network, node 200 generates power and heat (i.e., a thermal load). In order to prevent overheating and possible shut down, control circuit 208 of node 200 is configured to share traffic (and the thermal load caused by processing the traffic) with another node (e.g., a radio) in the network that can also act as a relay or advantaged node. Accordingly, node 200 may appoint another node in the network as a relay node for at least a portion of the message traffic directed to node 200. Accordingly, other nodes in the network will direct/transmit traffic through the new relay node. Node 200 is also configured to notify the network that it is no longer a relay node for this portion of message traffic.

Node 200 may continue to process the portion of traffic that must be delivered to or by node 200. By assigning a new relay node for at least a portion of traffic, the thermal load is shifted from one node to another across the network. By sharing the traffic load of a relay or advantaged node, a plurality of nodes are involved with carrying the thermal load for periods of time. Accordingly, the overall network performance is not restricted by the thermal capacity limitations of any one single node and the network is able to continue to operate. Each node in a network may be configured to shift traffic (and therefore thermal load) when it is appointed as a relay node and its thermal load reaches a predetermined level, i.e., when the thermal load of the node rises too high to be sustained. In this manner, the quality of service (QoS) handling of messages is based at least in part on the thermal capacity of the advantaged node, for example, a message of lower QoS may be routed a longer, slower path through the newly designated advantaged node to preserve the thermal capacity of a key advantaged node for messages with higher QoS.

Figure 3:
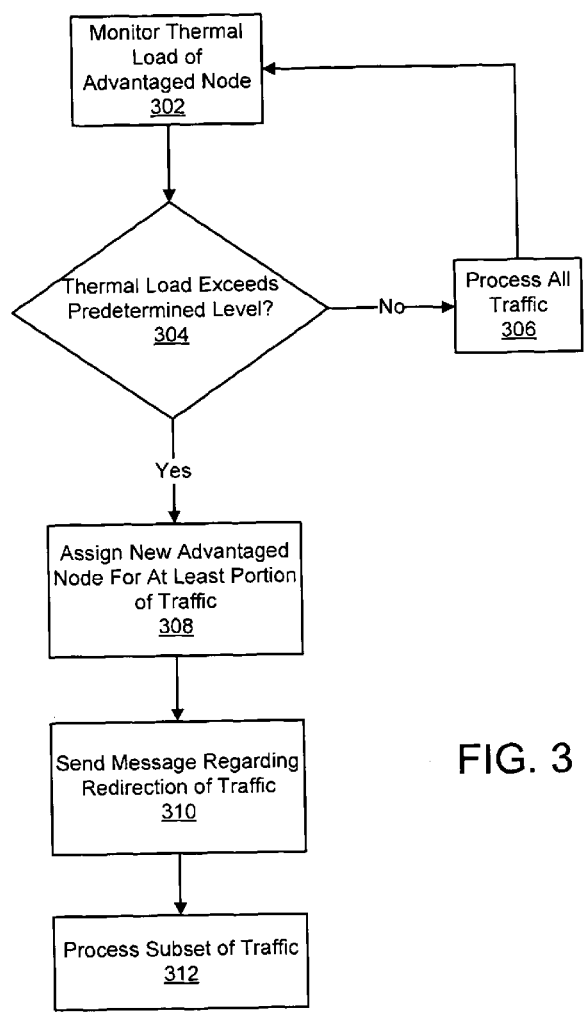
FIG. 3 illustrates a method of sharing a thermal load between nodes in a communication network in accordance with an embodiment.

FIG. 3 illustrates a method for sharing a thermal load between nodes in a communication network. At block 302, an advantaged node (e.g., a cluster head or relay node) of a network is configured to monitor its thermal load. If the power and heat generated (i.e., the thermal load) does not exceed a predetermined level (i.e., the advantaged node is capable of handling the sustained relayed traffic) at bock 304, the advantaged node operates as normal and processes all traffic at block 306. If the power and heat generated by the advantaged node is greater than a predetermined level (i.e., the thermal load rises too high to be sustained) at block 304, another node in the network is assigned as a new advantaged node for predetermined portion of traffic (e.g., traffic for a selected destination) at block 308. Preferably, the new advantaged node has excess thermal capacity. Accordingly, other nodes in the network will direct traffic through the new advantaged node. The original advantaged node also sends a message throughout the network announcing it will no longer be handling at least a portion of the message traffic and identifies the new advantaged node for this traffic at block 310. The original advantaged node may continue to process a portion of (or subset of) traffic that must be delivered to or delivered by the original advantaged node at block 312 as determined by the QoS level of the messages. Each new advantaged node may also be configured to share traffic with another node in the network if its thermal load rises too high to be sustained.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The systems and methods depicted and described are not limited to the precise details and conditions disclosed. Furthermore, other substitutions, modifications, changes, and omissions may be made in the design and arrangement of the exemplary embodiments without departing from the scope of the invention as expressed in the appended claims.

What is claimed is:

1. A method for sharing a thermal load between nodes in a communication network having a plurality of nodes, the method comprising:

monitoring the thermal load of a first node in the communication network using a control circuit, the first node being a first advantaged node configured to relay message traffic between at least two of the plurality of nodes;

using the control circuit to select a second node as a second advantaged node when the thermal load of the first node is greater than a predetermined value, wherein the second advantaged node is configured to share the thermal load of the first node by relaying at least a subset of the message traffic relayed by the first node; and using the control circuit to cause a transceiver to transmit a notification message to the plurality of nodes in the communication network identifying the second node as the second advantaged node for the subset of message traffic of the first node.

2. The method according to claim 1, wherein the notification message further indicates that the first node is not an advantaged node for the subset of message traffic.

3. The method according to claim 1, wherein each of the plurality of nodes is a radio.

4. The method according to claim 3, wherein each of the plurality of nodes is a software defined radio.

5. The method according to claim 1, wherein the communication network is a military tactical communication network.

6. The method according to claim 1, further comprising:
monitoring the thermal load of the second node; and
selecting a third node as a third advantaged node when the thermal load of the second node is greater than a predetermined value, wherein the third advantaged node is configured to share the thermal load of the second node by relaying at least a subset of the message traffic relayed by the second node.

7. The method according to claim 6, further comprising:
transmitting a notification message to the plurality of nodes in the communication network identifying the third node as an the third advantaged node the subset of message traffic for the second node.

8. The method according to claim 1, wherein the thermal load includes a temperature of the first node.

9. A node for a communications network, the node comprising:
an antenna;
a transceiver coupled to the antenna and configured to transmit and receive messages; and
a control circuit coupled to the transceiver and configured to monitor the thermal load of the node, to select a second node in the communication network as an advantaged node when the thermal load of the node is greater than a predetermined value, and to transmit a notification message identifying the second node as the advantaged node,
wherein the node is configured to relay message traffic between a plurality of nodes in the communications network, wherein the second node is configured to share the thermal load of the first node by relaying at least a subset of message traffic relayed by the node once the second node is selected as the advantaged node.

10. The node according to claim 9, wherein the node is a radio.

11. The node according to claim 10, wherein the node is a software defined radio.

12. The node according to claim 9, wherein the communications network is a military tactical communications network.

13. The node according to claim 9, wherein the notification message further indicates the node is not the advantaged node for the first subset of message traffic.

14. The node according to claim 9, wherein the control circuit is configured to receive and process a second subset of message traffic of the node.

15. The node according to claim 9, wherein the thermal load includes a temperature of the node.

16. A method for sharing thermal load of a relay node in a communication network having a plurality of nodes, the method comprising:
monitoring the thermal load of a first relay node in the communication network using a control circuit in communication with the first relay node, the first relay node being configured to relay message traffic between at least two of the plurality of nodes;
selecting another node as a second relay node when the thermal load of the first relay node is determined to exceed a predetermined value, wherein the second relay node is configured to share the thermal load of the first node by relaying at least a subset of the message traffic relayed by the first relay node; and
transmitting a notification message from a transceiver to the plurality of nodes in the communication network identifying the second relay node as a relay node for the subset of message traffic of the first relay node.

17. The method according to claim 16, wherein the notification message further indicates that the first relay node is not the relay node for the subset of message traffic.

18. The method according to claim 16, wherein each of the plurality of nodes is a radio.

19. The method according to claim 18, wherein each of the plurality of nodes is a software defined radio.

20. The method according to claim 16, wherein the communication network is a military tactical communication network.

* * * * *